United States Patent [19]

Shane

[11] Patent Number: 4,843,677
[45] Date of Patent: Jul. 4, 1989

[54] TILTED AXLE CASTER WITH BRAKE
[75] Inventor: Robert M. Shane, Berrien Springs, Mich.
[73] Assignee: Shepherd Products U.S., Inc., St. Joseph, Mich.
[21] Appl. No.: 171,485
[22] Filed: Mar. 21, 1988
[51] Int. Cl.⁴ .............................................. B60B 33/00
[52] U.S. Cl. .................................. 16/18 A; 16/35 R; 188/1.12
[58] Field of Search .............................. 16/18 A, 35 R; 188/1.12, 265

[56] References Cited
U.S. PATENT DOCUMENTS
2,138,433 11/1938 Sunden ................................ 16/35 R
3,238,558 3/1966 Greene ................................ 16/35 R
4,559,668 12/1985 Black ................................... 16/35 R Primary Examiner—Nicholas P. Godici
Assistant Examiner—Carmine Cuda
Attorney, Agent, or Firm—Mann, McWilliams, Zummer and Sweeney

[57] ABSTRACT

An enclosed tilted axle caster with an internally mounted brake mechanism includes a caster body, a caster wheel and a braking element of singular resilient construction completely internally disposed within the caster body. A cam element enclosed within the caster body is actuable by an operating pedal which extends out of the caster body for engagement by a foot to move the resilient braking element from its normally biased, released position, to a braking position in which the caster wheel is locked against rotation.

3 Claims, 1 Drawing Sheet

U.S. Patent   Jul. 4, 1989   4,843,677
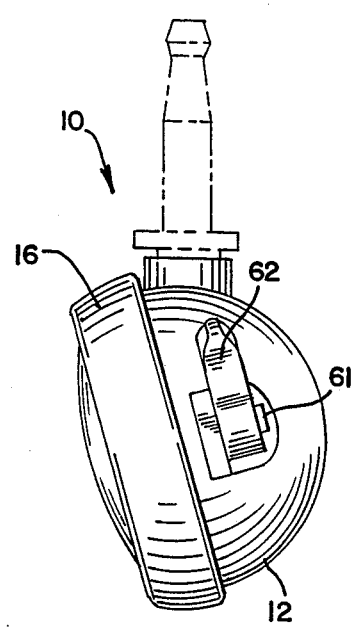
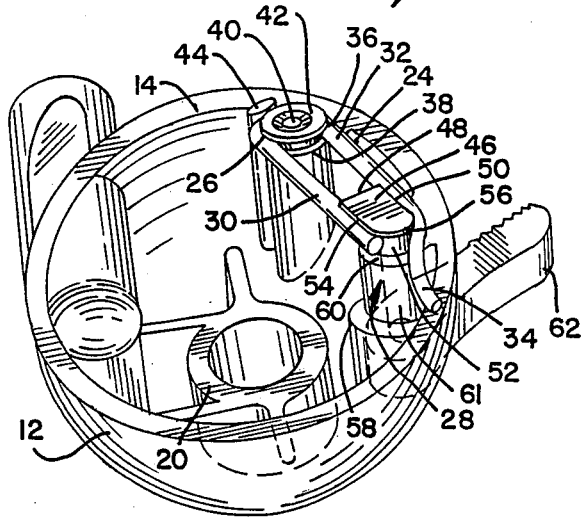
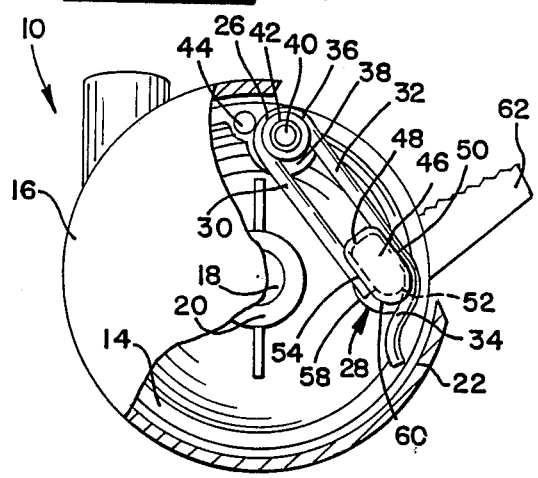
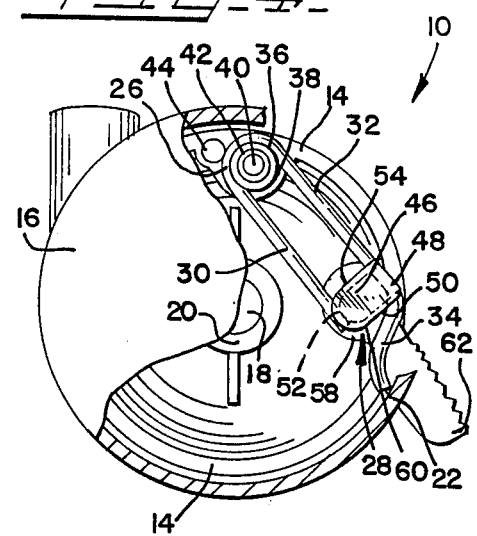

TILTED AXLE CASTER WITH BRAKE

BACKGROUND OF THE INVENTION

The present invention relates to tilted axle caster with a braking mechanism. Casters of the open or non-enclosed type which include braking mechanisms are shown in U.S. Pat. Nos. 2,138,433, 2,494,696, 2,707,794, 2,972,163, 3,066,764, 3,162,883, 3,228,089, 3,298,467 and 3,571,842. A caster of the enclosed, tilted axle type with a brake mechanism which includes a resilient biasing spring and a brake lever is shown in applicant's U.S. Pat. No. 3,238,558. None of these arrangements shows an enclosed tilted axle caster in which the braking element is of singular resilient construction and completely enclosed within the caster body, operable by a pedal located externally of the caster body.

SUMMARY OF THE INVENTION

The present invention provides an enclosed tilted axle caster with a brake mechanism consisting of a caster body, a caster wheel and a braking element of singular resilient construction enclosed within the caster body. The braking element is biased to a released position but movable to a braking position. A cam element is connected to a pedal which extends externally of the caster body. Moving the pedal from the released position to the braking position causes the cam to move the resilient brake element from the released position to the braking position so that the end of the braking element engages the inner surface of the caster wheel. This engagement prevents the caster wheel from rotation.

BRIEF DESCRIPTION OF THE DRAWINGS

FIG. 1 shows a front elevational view of the tilted axle caster of the present invention.

FIG. 2 shows a perspective view of the caster in FIG. 1 with the caster wheel removed.

FIG. 3 shows a sectional side view of the caster in FIG. 1 in the released position.

FIG. 4 shows a sectional side view of the caster in FIG. 1 in the braking position.

DETAILED DESCRIPTION OF THE INVENTION

An enclosed tilted axle caster, generally designated by the numeral 10, is shown in FIGS. 1-4. The caster 10 includes a caster body 12 defining at its outer edge 14 an open face. A caster wheel 16 is also provided defining at its outer edge an open face. The open face of the caster wheel 16 is disposed adjacent and partially surrounding and parallel to the open face of the caster body 12 which is nested within the open face of the caster wheel 16. An axle 18, one end of which is fit into a bearing sleeve 20 in the caster body 12 and the other end of which is rotatably mounted into a corresponding bearing sleeve (not shown) in the caster wheel 16, connects the caster body 12 and the caster wheel 16 to form an enclosed housing. An annular braking surface 22 is defined about the circumference of the inner surface of the caster wheel 16.

Disposed entirely within the caster body 12 is a substantially U-shaped resilient braking element 24 having a closed end 26 and an open end 28. The resilient braking element 24 comprises a spring lever having a fixed arm 30 and a movable actuating arm 32. It may be formed from a substantially cylindrical-shaped piece of metal wire or other suitable material. The actuating arm 32 defines at its end a contact element 34 adapted to engage the braking surface 22 of the caster wheel 16. The braking element 24 is normally biased to a released position, indicated in FIGS. 2 and 3, but is movable to a braking position, shown in FIG. 4 as will be described herein.

The resilient braking element 24 is connected to the caster housing 12 through a mounting arrangement which includes a first integral projection 36, defining a radially extending seat 38 about the base thereof, disposed within the caster body 12. The seat 38 is flush with the outer edge 14 of the caster body 12. The projection 36 is substantially cylindrical and has a recess 40 formed in the top thereof defining about its periphery a shoulder 42. The projection 36 is sized to receive the closed end 26 of the braking element 24. The closed end 26 of the braking element 24 is disposed about the projection such that the closed end 26 rests on the seat 38 and the shoulder 42 defined on the projection 36 retains the braking element 24 against the seat 38. The actuating arm 32 of the braking element 24 is disposed toward the outer edge 14 of the caster body 12 and the fixed arm 30 is disposed toward the axle 18.

A second substantially cylindrical integral projection 44 is also disposed in the caster body 12. The second projection 44 is space a sufficient distance from the first projection 36 such that the second projection 44 abuts the closed end 26 of the braking element 24 when the braking element 24 is positioned about the first projection 36. The abutment of the second projection 44 against the braking element 24 prevents the braking element 24 from slipping out of engagement with the first projection 36.

A substantially rectangular-shaped cam element 46 is rotatably mounted in the caster body 12 between the fixed arm 30 and the actuating arm 32 of the braking element 24 at the open end 28 thereof. The width of the cam element 46 is about the same as the distance between the actuating arm 32 and the non-actuating arm 30, while the length is considerably longer. The cam element 46 comprises an actuating front face 48, an actuating side face 50, a rear face 52 and a side face 54. Defined about the periphery of the upper edge of the cam element 46 is a lip 56. The cam element 46 is rotatable between a released position, shown in FIGS. 2 and 3, and a braking position, shown in FIG. 4. The biasing effect of the resilient arms 30 and 32 on the cam element 46 retain it in either the braking or the released position.

The cam element 46 is rigidly secured to one end of a shaft 61 rotatably disposed within an integral sleeve 58 formed in the caster body 12. The sleeve 58 lies flush with the outer edge 14 of the caster body 12 and defines a rim 60 about the periphery of the upper edge thereof. The arms 30 and 32 rest on the rim 60 and are retained thereon by the lip 56 of the cam element 46. A portion of the contact element 34 at the end of the actuating arm 32 rests on the outer edge 14 of the caster body 12.

The shaft 61 extends through the sleeve 58 and through the wall of the caster body 12 such that the end of the shaft 61 opposite the cam element 46 extends out of the caster body 12. Rigidly attached to this end is a pedal 62 movable between a released position, shown in FIGS. 2 and 3, and a braking position, shown in FIG. 4. As best seen in FIG. 3, when the pedal 62 is in the released position, it is pointed upwardly with respect to the surface upon which the caster is supported. When the pedal 62 is in the released position, the cam element 46 is in the released position and the braking element 24 is in the released position.

When the cam element 46 is in the non-actuating position, the actuating side face 50 of the cam element 46 lies adjacent to and in contact with the actuating arm 32 and the non-actuating side face 54 lies adjacent to and in contact with the non-actuating arm 30. The actuating front face 48 is disposed toward the closed end 26 of the braking element 24 and the non-actuating rear face 52 is disposed toward the open end 28 of the braking element 24.

When it is desired to prevent the rotation of the caster wheel 12, the pedal 62 is moved in a clockwise direction from the released position shown in FIG. 3 to the braking position shown in FIG. 4 by applying downward force thereto. This causes the shaft 61 to rotate clockwise, which in turn causes the cam element 46 to rotate clockwise from the nonactuating position to the actuating position. Because the length of the cam element 46 is considerably longer than the width, when the cam element 46 is rotated clockwise it overcomes the biasing force of the resilient braking element 24 and urges the actuating arm 32 outwardly toward the outer edge 14 of the caster body 12 so that the contact element 34 extends beyond the outer edge 14 and engages the braking surface 22 of the caster wheel 12, thereby preventing rotation. When the cam element 46 is in the braking position, best seen in FIG. 4, the actuating front face 48 of the cam element 46 is disposed adjacent to and in contact with the actuating arm 32 and the non-actuating rear face 52 of the cam element 46 is disposed adjacent to and in contact with the nonactuating arm 30. The actuating side face 50 is disposed toward the open end 28 of the braking element 24 and the non-actuating side face 54 is disposed toward the closed end 26.

When it is desired to disengage the brake and allow rotation of the caster wheel 16, the pedal 62 is lifted upward. This causes the shaft 61 and likewise, the cam element 46 to rotate counterclockwise so that the actuating arm 32 of the braking element 24 returns to the position shown in FIG. 3. The contact element 34 disengages the braking surface 22 permitting rotation of the center of the caster wheel 16.

The arrangement of the present invention, using a resilient spring lever braking element of unitary construction, is less costly than prior arrangements of the type shown in applicant's prior U.S. Pat. No. 3,238,558 because there are substantially fewer parts. Having the braking mechanism completely enclosed within the caster body 12 helps to prevent outside elements from interfering with the operation of the brake. Such an arrangement also eliminates the possibility of the braking mechanism becoming entangled with carpets or engaging and scratching other articles of furniture as was common with the exposed brake mechanisms of prior art devices.

Thus it has been shown that the present invention provides an enclosed tilted axle caster including a brake in which the braking element is completely housed in the caster body, but is operated from outside the outer body.

Various features of the invention have been particularly shown and described in connection with the illustrated embodiment of the invention, however, it must be understood that these particular arrangements merely illustrate and that the invention is to be given its fullest interpretation within the terms of the appended claims.

What is claimed is:

1. An enclosed tilted axle caster including a cup-like hollow caster body having an edge defining an open face, a cup-like hollow caster wheel having an edge defining an open face, said open face of said caster wheel disposed adjacent and parallel to said open face of said caster body, a pair of bearing sleeves, one formed in said caster body and one formed in said caster wheel, an axle disposed in said opposing bearing sleeves provided in said caster body and said caster wheel, such that said caster wheel is relatively rotatable with respect to said caster body, means on said caster body defining a vertical castering axis for said caster body, a resilient braking element of singular construction internally mounted within and on said caster body for movement between a braking position wherein said braking element contacts an inner surface of said caster wheel and a released position wherein said braking element is spaced from said inner surface of said caster wheel, said resilient braking element normally biased to said released position, said braking element comprising a spring lever having one end which is substantially U-shaped and another end which includes a fixed arm and a movable arm, retaining means for mounting said braking element to said caster body, said retaining means including first and second projections defined in said caster body, said first projection defining at its base a seat upon which the underside of said braking element rests, and defining at its upper edge, a shoulder which extends over the upper side of said braking element, such that said braking element is disposed between said shoulder and said seat, and said U-shaped end of said braking element is disposed adjacent to and about said first projection, said second projection positioned sufficiently near said first projection so as to ensure that said braking element remains disposed about said first projection, a cam element mounted within and on said caster body and in operative engagement with said resilient braking element for moving said braking element between its released position and its braking position and an operating pedal having one end extending from said caster body and another end located within said caster body and connected to said cam member to operate said braking element.

2. An enclosed tilted axle caster as in claim 1 in which said movable arm defines at the end thereof a contact element adapted to engage said inner surface of said caster wheel to effect braking when acted upon by said cam element.

3. An enclosed tilted axle caster as in claim 1 in which said cam element defines a lip about the periphery of the upper edge thereof, said lip extending over said arms of said braking element.

* * * * *